US009641389B2

(12) United States Patent
Kothari et al.

(10) Patent No.: US 9,641,389 B2
(45) Date of Patent: May 2, 2017

(54) METHOD AND SYSTEM FOR RECOVERING FROM NETWORK DISCONNECTS BY CLONING A VIRTUAL PORT

(71) Applicant: VMware, Inc., Palo Alto, CA (US)

(72) Inventors: Piyush Kothari, Palo Alto, CA (US); Mukesh Baphna, Milpitas, CA (US); ChiHsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 397 days.

(21) Appl. No.: 14/022,054

(22) Filed: Sep. 9, 2013

(65) Prior Publication Data
US 2015/0071110 A1    Mar. 12, 2015

(51) Int. Cl.
*H04L 1/00*   (2006.01)
*H04L 12/24*   (2006.01)

(52) U.S. Cl.
CPC ...... *H04L 41/0846* (2013.01); *H04L 41/0663* (2013.01)

(58) Field of Classification Search
CPC . H04L 12/4679; H04L 29/1237; H04L 41/08; H04L 49/208; H04L 49/13
USPC ........................................................ 370/254
See application file for complete search history.

(56) References Cited

U.S. PATENT DOCUMENTS

| 6,983,324 | B1 | | 1/2006 | Block et al. | |
|---|---|---|---|---|---|
| 7,933,993 | B1 | * | 4/2011 | Skinner | G06F 9/5077 709/209 |
| 7,979,517 | B1 | * | 7/2011 | Wang et al. | 709/221 |
| 8,195,774 | B2 | * | 6/2012 | Lambeth | H04L 29/12839 709/220 |
| 8,274,993 | B2 | * | 9/2012 | Sharma et al. | 370/465 |
| 8,370,530 | B2 | | 2/2013 | Tripathi et al. | |
| 8,385,202 | B2 | | 2/2013 | Kuik et al. | |
| 8,635,614 | B2 | * | 1/2014 | Biswas et al. | 718/1 |
| 9,021,116 | B2 | * | 4/2015 | Kotha | H04L 12/56 370/355 |
| 9,432,254 | B1 | * | 8/2016 | Naqvi | H04L 12/2409 |
| 2003/0051049 | A1 | | 3/2003 | Noy et al. | |
| 2003/0115256 | A1 | * | 6/2003 | Brockway | G06F 9/4411 709/203 |
| 2007/0038679 | A1 | * | 2/2007 | Ramkumar et al. | 707/200 |
| 2008/0244028 | A1 | * | 10/2008 | Le et al. | 709/208 |
| 2009/0157846 | A1 | * | 6/2009 | Shimozono et al. | 709/218 |
| 2010/0232443 | A1 | * | 9/2010 | Pandey | H04L 49/10 370/401 |

(Continued)

OTHER PUBLICATIONS

Call, Curtis; "This Week: Applying Junos Automation"; Dec. 31, 2011; Part 1—Front Cover—p. 46.

(Continued)

*Primary Examiner* — Ricky Ngo
*Assistant Examiner* — Dewanda Samuel

(57) ABSTRACT

Techniques for managing the configuration of managed nodes in a virtual machine network are disclosed. In an embodiment, managing the configuration of a managed node involves creating a clone of a virtual port on the managed node and using the cloned virtual port as an alternative communication channel between the managed node and a virtual machine management system to modify the virtual port. This technique can be used to restore connectivity to a managed node, such as a virtual switch, when connectivity is lost due to a misconfigured virtual port.

13 Claims, 12 Drawing Sheets

(56) References Cited

U.S. PATENT DOCUMENTS

| | | |
|---|---|---|
| 2011/0022695 A1* | 1/2011 | Dalal .................... G06F 9/5077 |
| | | 709/222 |
| 2013/0055092 A1 | 2/2013 | Cannon et al. |
| 2013/0055244 A1 | 2/2013 | Cannon et al. |
| 2013/0086236 A1 | 4/2013 | Baucke et al. |
| 2013/0144992 A1 | 6/2013 | Barabash et al. |
| 2013/0148511 A1 | 6/2013 | Banga et al. |
| 2013/0166703 A1 | 6/2013 | Hammer et al. |
| 2013/0174157 A1 | 7/2013 | Elzur |
| 2013/0262711 A1* | 10/2013 | Louzoun et al. ................. 710/9 |
| 2014/0012966 A1* | 1/2014 | Baphna ................... H04L 49/70 |
| | | 709/221 |
| 2014/0258479 A1 | 9/2014 | Tenginakai et al. |
| 2015/0030024 A1 | 1/2015 | Venkataswami et al. |
| 2015/0058469 A1 | 2/2015 | Li et al. |

OTHER PUBLICATIONS

Call, Curtis; "This Week: Applying Junos Automation"; Dec. 31, 2011; Part 2—p. 47-120.
Call, Curtis; "This Week: Applying Junos Automation"; Dec. 31, 2011; Part 3—p. 121-192.
Call, Curtis; "This Week: Applying Junos Automation"; Dec. 31, 2011; Part 4—p. 193-246.
Deshpande, Vyenkatesh; "vSphere 5.1—VDS New Features—Rollback Recovery and Backup Restore—VMware vSphere Blog"; Jan. 22, 2013; https://blogs.vmware.com/vshere/2013/01/vsphere-5-1-vds-new-features-rollback-recovery-and-backup-restore.html; 6 pages.
European Search Report, 14841680, Mar. 17, 2017.

* cited by examiner

METHOD AND SYSTEM FOR RECOVERING FROM NETWORK DISCONNECTS BY CLONING A VIRTUAL PORT

BACKGROUND

Software applications, such as virtual machines (VMs), may be executed by a group, or "cluster," of host computing devices. Each VM creates an abstraction of the physical computing resources, such as a processor and memory, of the host executing the VM and executes a "guest" operating system, which, in turn, executes one or more software applications. To the guest operating system and software applications, the abstracted resources may be functionally indistinguishable from the underlying physical resources.

Within a particular host computing device, virtual switches can be used to communicate data packets between the VMs and between other nodes in a network. For example, virtual switches that emulate physical Ethernet switches have been implemented within host computing devices to enable the communication of data packets between VMs.

As with physical data packet switches, virtual switches need certain networking parameters to be configured to establish working connections between nodes. When a node is virtual, such as a virtual switch, the networking parameters to be configured include a virtual port. In a large network, the number of nodes to be connected can include hundreds of host computing devices and thousands of VMs. Centralized management systems have been developed to allow an administrator to manage network configuration tasks. Centralized management systems require working network connections between the virtual switches and the management system to communicate configuration information. Additionally, these centralized management systems typically limit direct user modification of nodes in order to prevent a loss of communication caused by an incorrect user modification of a node. However, in some cases, configuration changes called out by the management system cause communications between the management system and the managed node to be lost and restoring communication can be a labor-intensive and tedious task.

SUMMARY

Techniques for managing the configuration of managed nodes in a virtual machine network are disclosed. In an embodiment, managing the configuration of a managed node involves creating a clone of a virtual port on the managed node and using the cloned virtual port as an alternative communication channel between the managed node and a virtual machine management system to modify the virtual port. This technique can be used to restore connectivity to a managed node, such as a virtual switch, when connectivity is lost due to a misconfigured virtual port. For example, if a virtual port is configured in such a way that the virtual machine management system is no longer able to communicate with the managed node, a cloned version of the misconfigured virtual port is created on the managed node and the cloned virtual port is configured to create an alternative communication channel between the virtual machine management system and the virtual switch without having to completely configure a new port on each corresponding host computing device. The alternative communication channel can then be used by the virtual machine management system to reconfigure the virtual port so that communications can eventually be restored to the virtual port. Using a clone of a virtual port as an alternative communication channel provides an efficient alternative to the conventional labor-intensive and tedious tasks that are typically used to restore communication to a managed node.

In an embodiment, a method for managing the configuration of managed nodes in a virtual machine network is disclosed. The method involves creating a clone of a virtual port on a managed node and using the cloned virtual port as an alternative communication channel to access the managed node and to modify a configuration parameter of the virtual port.

In another embodiment, a non-transitory computer-readable storage medium containing program instructions for managing the configuration of managed nodes in a virtual machine network is disclosed. Execution of the program instructions by one or more processors causes the one or more processors to perform steps includes creating a clone of a virtual port on a managed node and using the cloned virtual port as an alternative communication channel to access the managed node and to modify a configuration parameter of the virtual port.

In another embodiment, a computer system is disclosed. The computer system includes at least one host computing device, the host computing device including a processor and memory for instantiating managed nodes thereon. The at least one host computing device is configured to create a clone of a virtual port on at least one of the managed nodes and use the cloned virtual port as an alternative communication channel to access the at least one managed node and to modify a configuration parameter of the virtual port.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
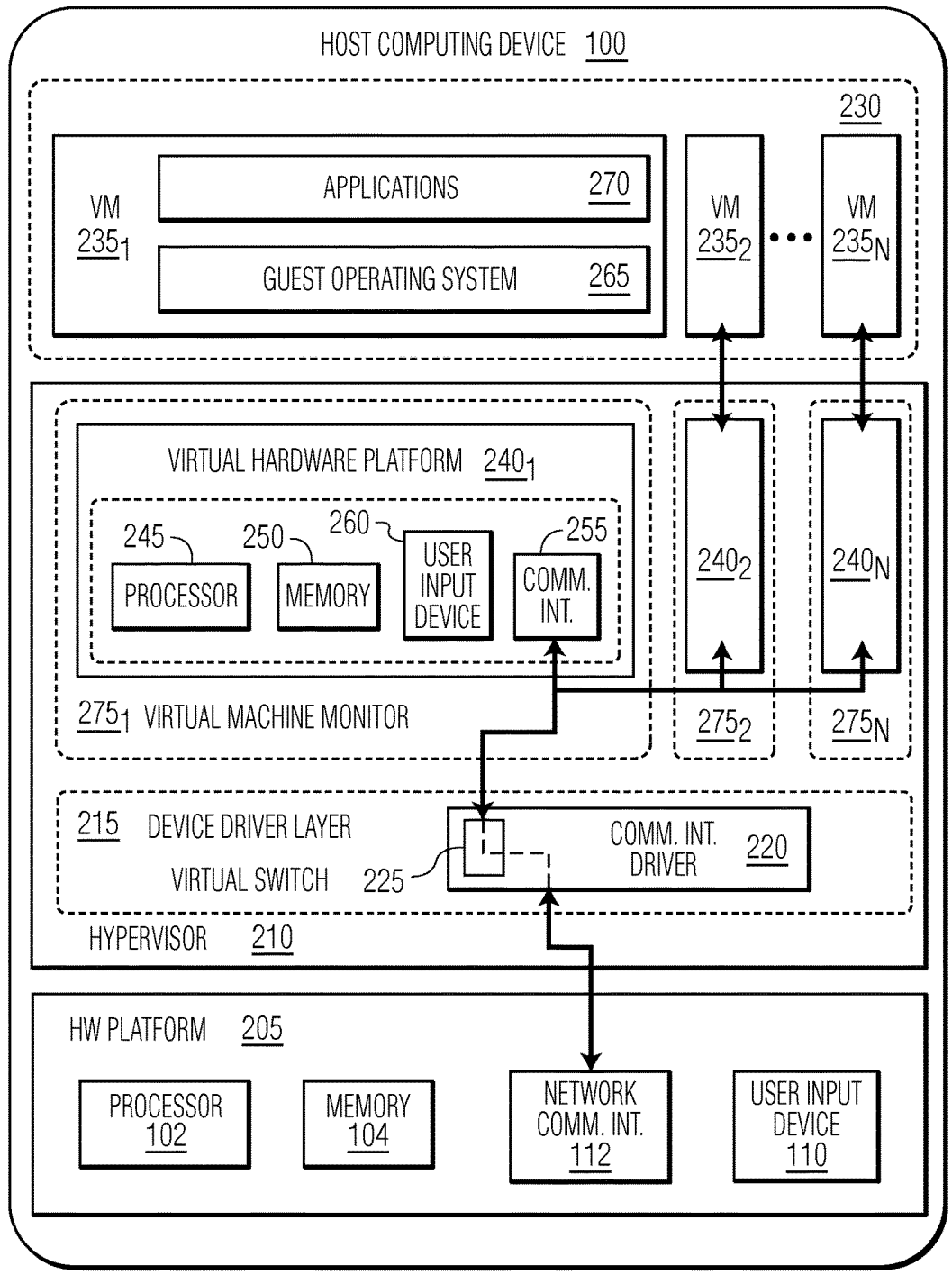
FIG. 1 is a block diagram of a host computing device that supports virtual machines.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Techniques for managing the configuration of managed nodes in a virtual machine network are disclosed. In an embodiment, a managed node is a virtual switch and a virtual machine network that includes the virtual switch is configured to allow for the creation of a clone of a virtual port on the virtual switch and to use the cloned virtual port as an alternative communication channel between the virtual switch and the virtual machine management system to modify the virtual port. This technique can be used to restore connectivity to the virtual switch if the virtual switch becomes disconnected from the virtual management system due to a misconfiguration of the virtual port. For example, if the virtual port is configured in such a way that the ability of the virtual machine management system to communicate with the virtual switch is lost, the misconfigured virtual port can be cloned through a service console that is separate from the virtual machine management system. The cloned virtual port can then be reconfigured to create an alternative communication channel between the virtual machine management system and the virtual switch without having to configure a completely new port on each underlying host on which the virtual switch is instantiated. The alternative communication channel can then be used by the virtual machine management system to reconfigure the original virtual port so as to restore communication between the virtual machine management system and the virtual switch. Creating a clone of a misconfigured virtual port and using the cloned virtual port as an alternative communication channel to restore communication to the misconfigured virtual port provides an efficient alternative to conventional labor-intensive and tedious tasks that are typically used to reconnect to a managed node.

FIG. 1 depicts a block diagram of virtual machines (VMs) $235_1$, $235_2$ . . . $235_N$ that are instantiated on a computing device 100, the computing device may be referred to as a "host computing device," a "host," or a "host server." Host computing device 100 includes a hardware platform 205, such as an x86 architecture platform. Hardware platform 205 may include a processor 102, memory 104, a network communication interface 112, a user input device 110, and other input/output (I/O) devices, such as a display device. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. The hypervisor 210 includes a device driver layer 215, and maps physical resources of the hardware platform 205 (e.g., processor 102, memory 104, network communication interface 112, and/or user input device 110) to "virtual" resources of each of the VMs $235_1$-$235_N$ such that each of the VMs $235_1$-$235_N$ has its own virtual hardware platform (e.g., a corresponding one of virtual hardware platforms $240_1$-$240_N$). Each virtual hardware platform includes its own emulated hardware (such as a processor 245, memory 250, a network communication interface 255, and a user input device 260).

In some embodiments, the memory 250 in the first virtual hardware platform $240_1$ includes a virtual disk that is associated with or "mapped to" one or more virtual disk images stored in the memory 104 (e.g., a hard disk or solid state disk) of the host computing device 100. The virtual disk image represents a file system (e.g., a hierarchy of directories and files) used by the first virtual machine $235_1$. In addition, or alternatively, virtual disk images may be stored in the memory of one or more remote computing devices, such as in a storage area network (SAN).

The virtual hardware platforms $240_1$-$240_N$ of the host computing device 100 may function as equivalents of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as a guest operating system (OS) 265 in order to execute applications 270 for an instantiated VM, e.g., VM $235_1$-VM $235_N$. Virtual hardware platforms $240_1$-$240_N$ may be considered to be part of virtual machine monitors (VMM) $275_1$-$275_N$, which implement virtual system support to coordinate operations between the hypervisor 210 and corresponding VMs $235_1$-$235_N$. Those with ordinary skill in the art will recognize that the various terms, layers, and categorizations used to describe the virtualization components in the host computing device of FIG. 1 may be referred to differently without departing from their functionality or the spirit or scope of the disclosure. For example, virtual hardware platforms $240_1$-$240_N$ may also be considered to be separate from the VMMs $275_1$-$275_N$, and the VMMs $275_1$-$275_N$ may be considered to be separate from the hypervisor 210. One example of the hypervisor 210 that may be used in an embodiment of the disclosure is included as a component in VMWARE's ESX brand software, which is commercially available from VMWARE, INC.

In the embodiment of FIG. 1, the device driver layer 215 of the host computing device 100 includes a communication interface driver 220 that interacts with the network communication interface 112 to receive and transmit data from, for example, a local area network (LAN) that is connected to the host computing device 100. The communication interface driver 220 also includes a virtual switch 225 that emulates the switching of data packets (e.g., Layer 2 Ethernet packets, where the concept of network layers is described in the Open System Interconnect (OSI) model as defined by the International Standards Organization (ISO)) in a physical network. For example, the virtual switch may switch Ethernet packets between different VMs on the same host computing device or switch Ethernet packets received at the network communication interface 112 to the communication interfaces 255 of the VMs $235_1$-$235_N$. In an embodiment, the network communication interface 112 is a physical network adapter (e.g., an Ethernet network interface card (NIC)) while the communications interfaces 255 are virtual network adapters (e.g., virtual Ethernet NICs). Similar to physical Ethernet NICs, each virtual communication interface is assigned a unique Media Access Control (MAC) address that enables the virtual switch 225 to switch Ethernet packets to and from the VMs. Virtual network adapters and virtual switches are described in more detail below.

Additionally, the communication interfaces 255 of the virtual hardware platforms $240_1$-$240_n$ support logical connections or communication channels between nodes (e.g., virtual to virtual connection and/or physical to virtual connections). In an embodiment, a communication channel may be defined by physical and/or virtual components, by which network communication traffic can travel. In a particular embodiment, the communication interfaces 255 are embodied at least in part as a virtual port. Parameters of a virtual port are described in more detail below.

In an embodiment, the host computing device 100 of FIG. 1 is a server that is commonly found in a data center. As an example, the host computing device may be installed with multiple other host computing devices in one or more server racks. Typically, the host computing devices are grouped together in "clusters," which are located within the same server rack. For example, a cluster of host computing devices are connected by a LAN into a "production LAN."

Figure 2:
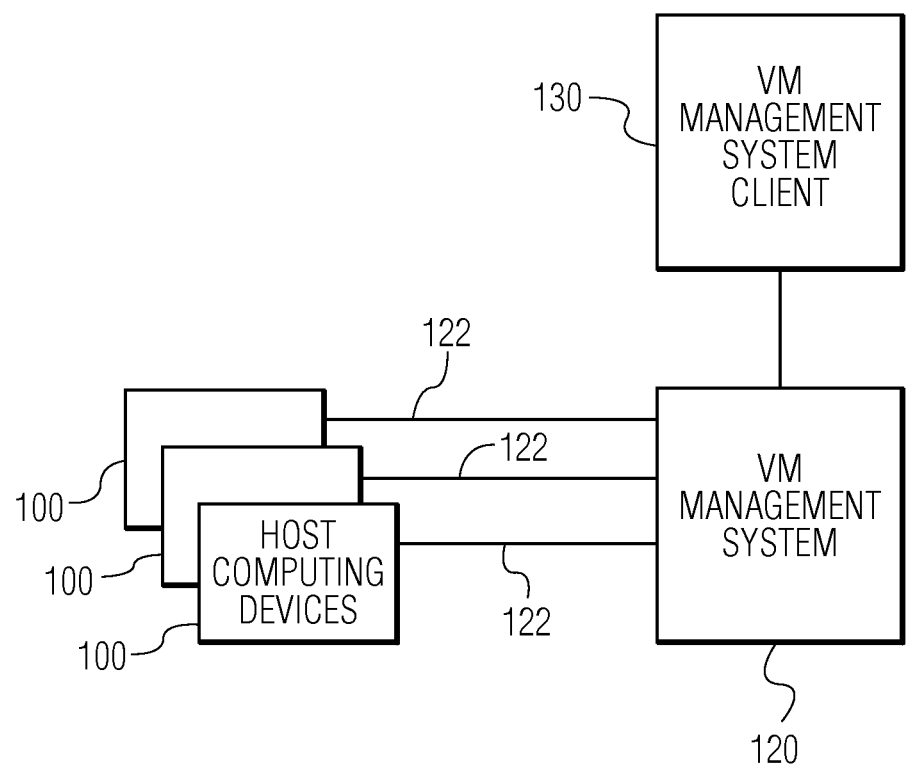
FIG. 2 depicts an embodiment of a computer network that includes multiple host computing devices that are each connected to a virtual machine (VM) management system.

FIG. 2 depicts an embodiment of a computer network that includes multiple host computing devices 100 that are each connected to a virtual machine management system 120 via, for example, LAN and/or WAN connections 122. The host computing devices are configured to deliver virtualization-based services as described above with reference to FIG. 1 and the virtual machine management system is configured to manage the virtual infrastructure, including managing the host computing devices, the virtual machines running within each host computing device, network configuration within the host computing devices, provisioning, migration, resource allocations, and so on. One example of a virtual machine management system that may be used in an embodiment of the disclosure is the VCENTER SERVER brand software, which is commercially available from VMWARE, INC. In an embodiment, the virtual machine management system is run on a server machine that is physically separate from the host computing devices although it is possible that the virtual machine management system is run on one of the host computing devices or shared between a physically separate machine and one of the host computing devices. The virtual machine management system is accessible by a user through a virtual machine management system client (client) 130. In one embodiment, the client is a standalone client application and in another embodiment, the client is provided as a web browser application that provides management access from any networked device. The virtual machine management system client allows an administrator to actively manage the virtual infrastructure, including managing the host computing devices, the virtual machines running within each host computing device, network configuration, provisioning, migration, resource allocations, and so on.

As mentioned above with reference to FIG. 1, the host computing device 100 includes the virtual switch 225 instantiated thereon. In an embodiment, the virtual switch allows the networking of virtual machines in the same way that physical machines are connected. For example, the virtual switch allows virtual machines on a host computing device (e.g., an ESX server) to communicate with each other using the same protocols that would be used over physical switches without the need for additional networking hardware. Virtual switches also support virtual LANs (VLANs) that are compatible with standard VLAN implementations. It is also possible for a single host computing device to include multiple different virtual switches.

Figure 3:
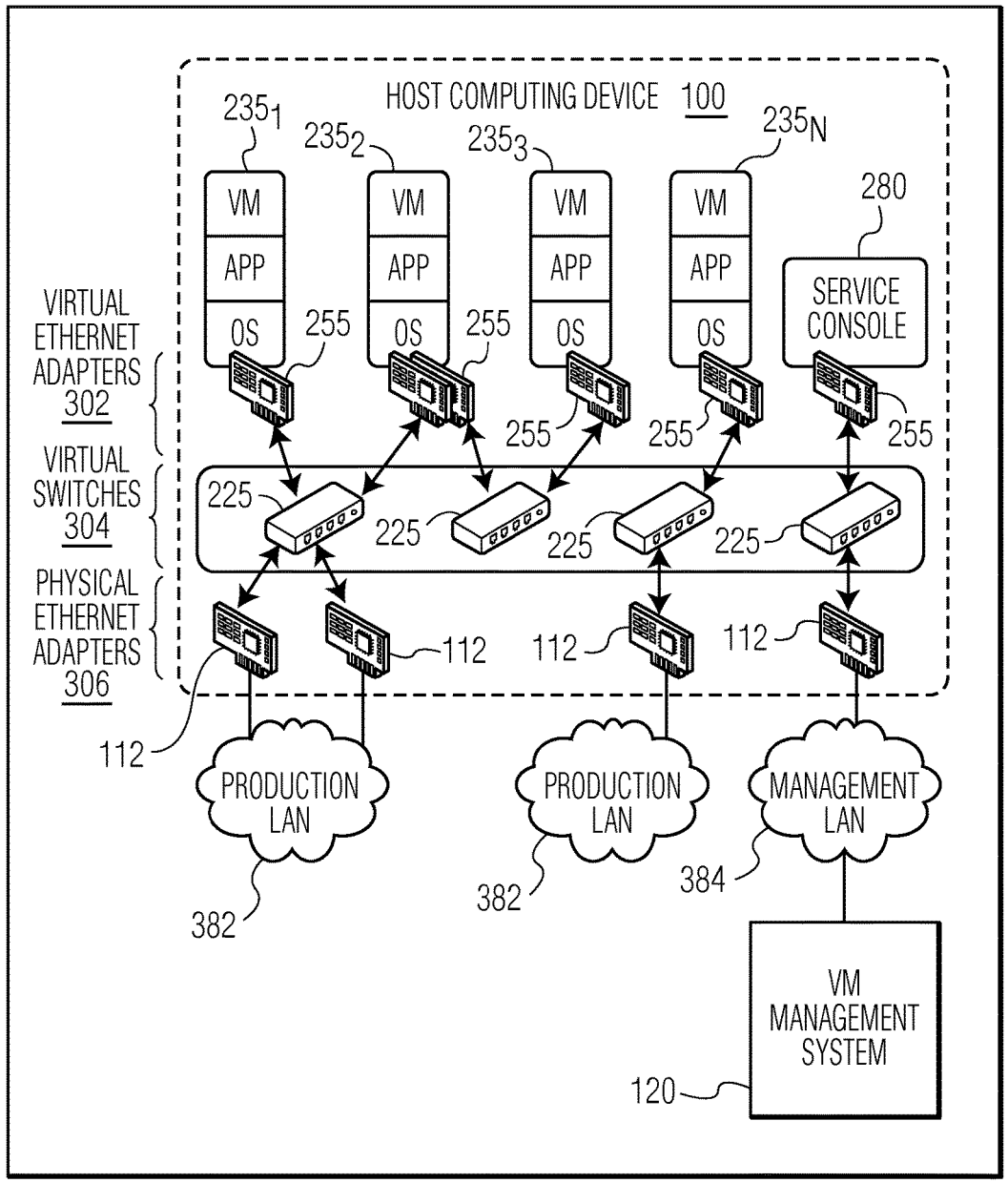
FIG. 3 illustrates the concept of virtual switching in a host computing device that has multiple instantiated VMs.

FIG. 3 illustrates the concept of virtual switching in a host computing device that has multiple instantiated VMs. In the conceptual illustration of FIG. 3, the host computing device 100 includes multiple instantiated VMs (VM $235_1$-VM $235_N$), a service console 280, multiple virtual communications interfaces 255 (e.g., virtual Ethernet adapters), multiple virtual switches 225, and multiple network communications interfaces 112 (e.g., physical Ethernet adapters). The virtual Ethernet adapters, virtual switches, and physical Ethernet adapters are depicted in bracketed rows 302, 304, and 306, respectively. The physical Ethernet adapters of the host computing device enable the host computing device to connect to different external LANs, including production LANs 382 and a management LAN 384. In an embodiment, the virtual Ethernet adapters have their own MAC addresses and unicast, multicast, and/or broadcast filters and the virtual Ethernet adapters are Layer 2 devices. As illustrated in FIG. 3, a virtual machine can be configured with one or more virtual Ethernet adapters, with each of the virtual Ethernet adapters having a unique IP address and MAC address. Examples of virtual Ethernet adapters include:

vmxnet—a paravirtualized device that works only if VMware Tools is installed in the guest operating system. A paravirtualized device is one designed with specific awareness that it is running in a virtualized environment.

vlance—a virtual device that provides strict emulation of the AMD LANCE PCNet32 Ethernet adapter. It is compatible with most 32-bit guest operating systems. This adapter is used when the flexible network adapter is selected but VMware Tools is not installed in the guest operating system.

e1000—a virtual device that provides strict emulation of the INTEL E1000 Ethernet adapter. This is the virtual Ethernet adapter used in 64-bit virtual machines. It is also available in 32-bit virtual machines.

vswif—a paravirtualized device similar to the vmxnet adapter that is used only by the ESX Server service console.

vmknic—a virtual device in the VMkernel, the software layer that manages most of the physical resources on the ESX Server host. The vmknic adapter is used by the TCP/IP stack that services VMotion, NFS and software iSCSI clients that run at the VMkernel level, and remote console traffic. In an embodiment, the VMkernel is a networking interface that provides network connectivity for the ESX Server.

In a physical system, an Ethernet adapter contains the circuitry to facilitate the communication between a low layer internet protocol (e.g., IP and IPv6) and the physical Ethernet medium (e.g., optical fiber cable or twisted pair cable). The adapter is configured so that it can communicate with the low layer internet protocol used as well as the Ethernet medium to which it is attached. While not a complete list, the MAC address, the type of duplex (e.g., half or full), and the transfer rate are all examples of settings to be configured on the adapter.

In a virtual machine environment, a virtual implementation of an Ethernet adapter is also possible and offers several added advantages to the pure physical implementation discussed above. A first benefit is that, in a host computing device running a virtual management system, a virtual port on the virtual adapter will be configured to know authoritatively the configured receive filters for other virtual Ethernet adapters to which the port is attached, thereby removing the need for MAC learning. A second benefit is that the guest operating systems as shown in FIG. 3 cannot change the configuration of their corresponding adapter (e.g., a guest operating system cannot change the MAC address of a virtual port) because configuration for the adapter is stored in a file outside of control by the guest operating system.

The virtual switches 225, as implemented on the host computing device 100 (e.g., an ESX Server) work in much the same way as physical Ethernet switches. For example, each virtual switch maintains a MAC port forwarding table and performs a look up on the destination MAC address of each arriving packet and then forwards the packet to one or more ports for transmission. In an embodiment, up to 248 different virtual switches can be created and simultaneously run on each host computing device.

By way of a non-limiting example, when a managed node is implemented as a virtual switch, up to 1,016 virtual ports can be created on the virtual switch. The virtual ports can be either pure virtual ports (i.e., no physical connection can be made to the port) or uplink virtual ports (i.e., associated with a physical adapter). Uplink ports serve as connections between the virtual network and a physical network and, while potentially all of the virtual ports can be made as pure virtual ports, only a maximum of 32 ports can be made as uplink ports. Additionally, both uplink virtual ports and pure virtual ports can be grouped and added to a virtual LAN (VLAN).

Figure 4:
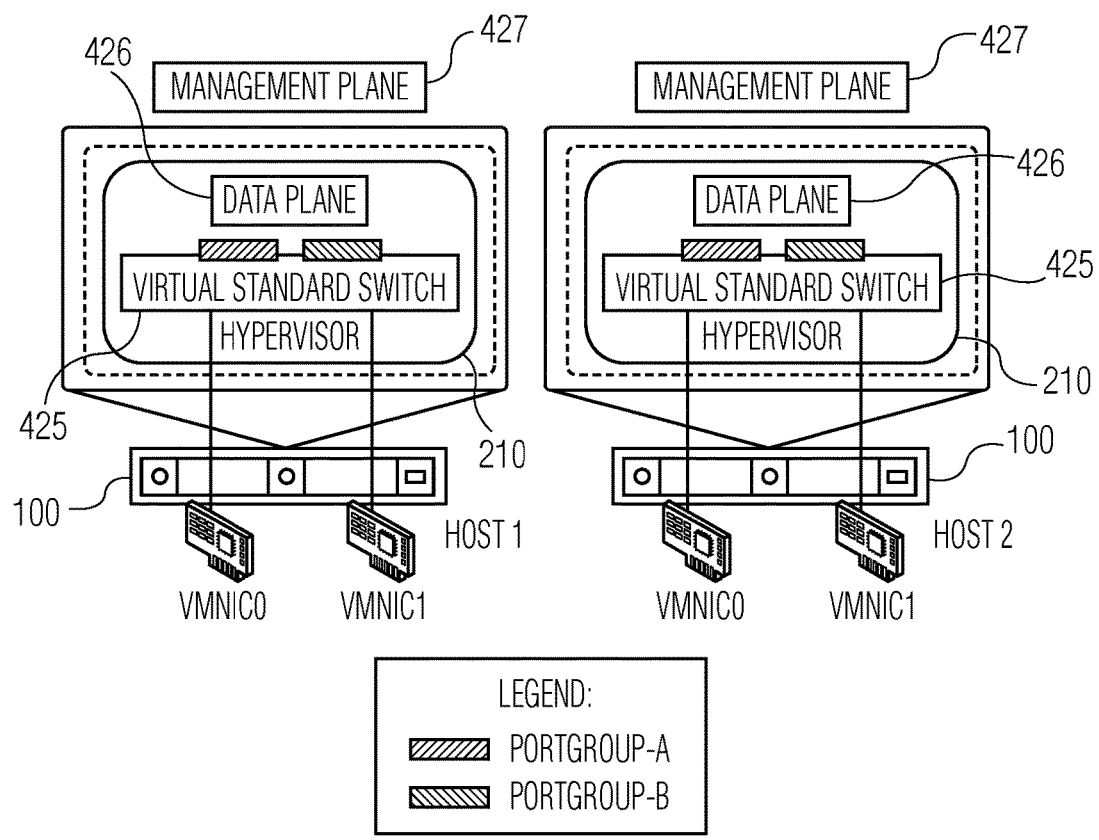
FIG. 4 provides a conceptual illustration of two different virtual standard switches (VSSs) that are implemented on two different host computing devices.

In an embodiment, virtual switches can be implemented as either a virtual standard switch (VSS) or a virtual distributed switch (VDS). FIG. 4 provides a conceptual illustration of two different VSSs that are implemented on two different host computing devices. As shown in FIG. 4, the host computing device 100, identified as "Host 1," runs a hypervisor 210 (e.g., ESX Server) and a VSS 425 is implemented within the hypervisor. The VSS can be thought of as having two planes, a data plane 426 and a management plane 427. The data plane implements the actual packet switching, filtering, tagging, etc. and the management plane is the control structure used to allow an administrator to configure the data plane functionality. The host computing device identified as "Host 2" includes a similar VSS. The data plane and management plane of the respective VSSs are instantiated on the respective host computing devices and an administrator must configure and maintain each VSS on an individual basis.

Figure 5:
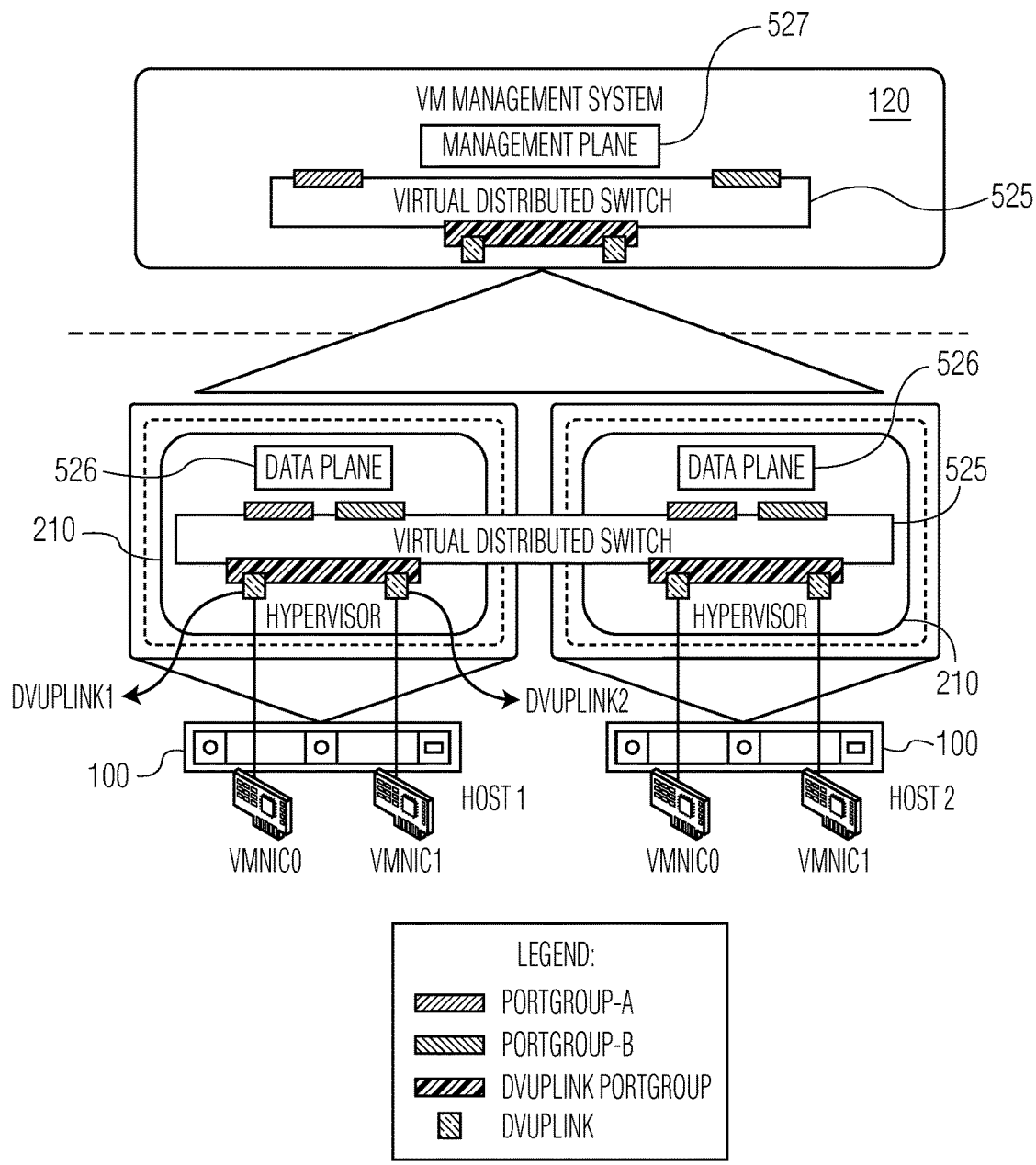
FIG. 5 provides a conceptual illustration of a virtual distributed switch (VDS) that is implemented across two different host computing devices.

FIG. 5 provides a conceptual illustration of a VDS 525 that is implemented across two different host computing devices 100, identified as "Host 1" and "Host 2." A VDS functions as a single virtual switch across all associated host computing devices. One benefit of implementing a VDS across multiple host computing devices is that the VDS allows virtual machines to maintain a consistent network configuration as the VMs migrate across multiple host computing devices. As shown in FIG. 5, both host computing devices run a hypervisor 210 (e.g., ESX Server) and the VDS is implemented across both of the hypervisors. The VDS can also be thought of as having a data plane 526 and a management plane 527, with the data plane remaining local to each hypervisor but the management plane being centralized in the virtual machine management system 120. The implementation of VDSs can ease the management burden of per-host virtual switch configuration by treating the network as an aggregated resource in which individual host-level virtual switches are abstracted into a single large VDS that spans multiple hosts. In one example, each virtual machine management system (e.g., each VCENTER SERVER instance) can support up to 128 different VDSs and each VDS can be distributed over up to 500 different host computing devices.

In an embodiment, functions implemented by both VSSs and VDSs include forwarding L2 packets, segmenting traffic into VLANs, using and understanding IEEE 802.1q VLAN encapsulation, and traffic shaping for the outbound (TX) traffic. In an embodiment, functions implemented by only VDSs include shaping inbound (RX) traffic, centralized unified management interface through VCENTER SERVER, and Private VLANs (PVLANs).

Referring back to FIG. 3, the virtual switches 225, either VSSs or VDSs, are typically managed from the virtual machine management system 120. In an embodiment, the virtual machine management system communicates with a virtual switch by sending communication traffic to a virtual port on the virtual switch. If a virtual port of a virtual switch becomes misconfigured, the connection between the virtual machine management system and the virtual switch via the misconfigured virtual port will be lost. That is, the virtual machine management system and the virtual switch will not be able to communicate at all via that virtual port, or in at least one direction.

Various different events can cause the connection between the virtual machine management system and a virtual switch, also referred to as a managed node, to be lost. These events can be grouped, for example, into two categories: host networking events (e.g., related to VSSs) and distributed switch events (e.g., related to VDSs). Host networking events that may cause a connection to be lost include: updating the speed or duplex of a physical NIC; updating DNS and routing settings; updating teaming and failover policies or traffic shaping policies of a standard port group that contains the management VMkernel network adapter; updating the VLAN of a standard port group that contains the management VMkernel network adapter; increasing the maximum transmission unit (MTU) of management VMkernel network adapters and a corresponding virtual switch to values not supported by the physical infrastructure; changing the IP settings of management VMkernel network adapters; and removing the management VMkernal network adapter from a VSS or VDS. Distributed switch events that may cause a connection to be lost include: changing the MTU of a distributed switch; changing the settings (teaming and failover, VLAN, traffic shaping) in the distributed port group of the management VMkernel network adapter; blocking all ports in the distributed port group containing the management VMkernel network adapter; and overriding the policies above for the distributed port to which the management VMkernel network adapter is connected.

When a virtualized environment includes thousands of different VMs running on hundreds of different host computing devices, a configuration change to a port or a managed node that causes a managed node or nodes to be disconnected from the virtual machine management system can cause severe disruption in the network. This is especially important when running VDSs. In a VDS environment, where multiple host computing devices are associated with the same VDS, any network failure or misconfiguration of the management port group can potentially disconnect all of the host computing devices from the virtual machine management system. In this situation, the virtual machine management system is not able to centrally make any changes to the VDS configuration (e.g., VDS port group) and push those changes to host computing devices. A conventional technique used to recover from such a disconnection involves accessing each individual host computing device and building a VSS with a proper management network configuration. After all of the management networks of the affected hosts have been reconfigured with a VSS and are able to communicate on the management network, the virtual machine management system can again manage the host computing devices and reconfigure the VDS. Such a conventional technique tends to be tedious and labor intensive.

FIGS. 6A-6D illustrate a technique for recovering communication between a virtual machine management system and a virtual switch, such as a VDS, which involves cloning a virtual port and then using the cloned virtual port as an alternative communication channel between the virtual switch and the virtual machine management system to modify a misconfigured virtual port so that connectivity can be restored.

Figure 6A:
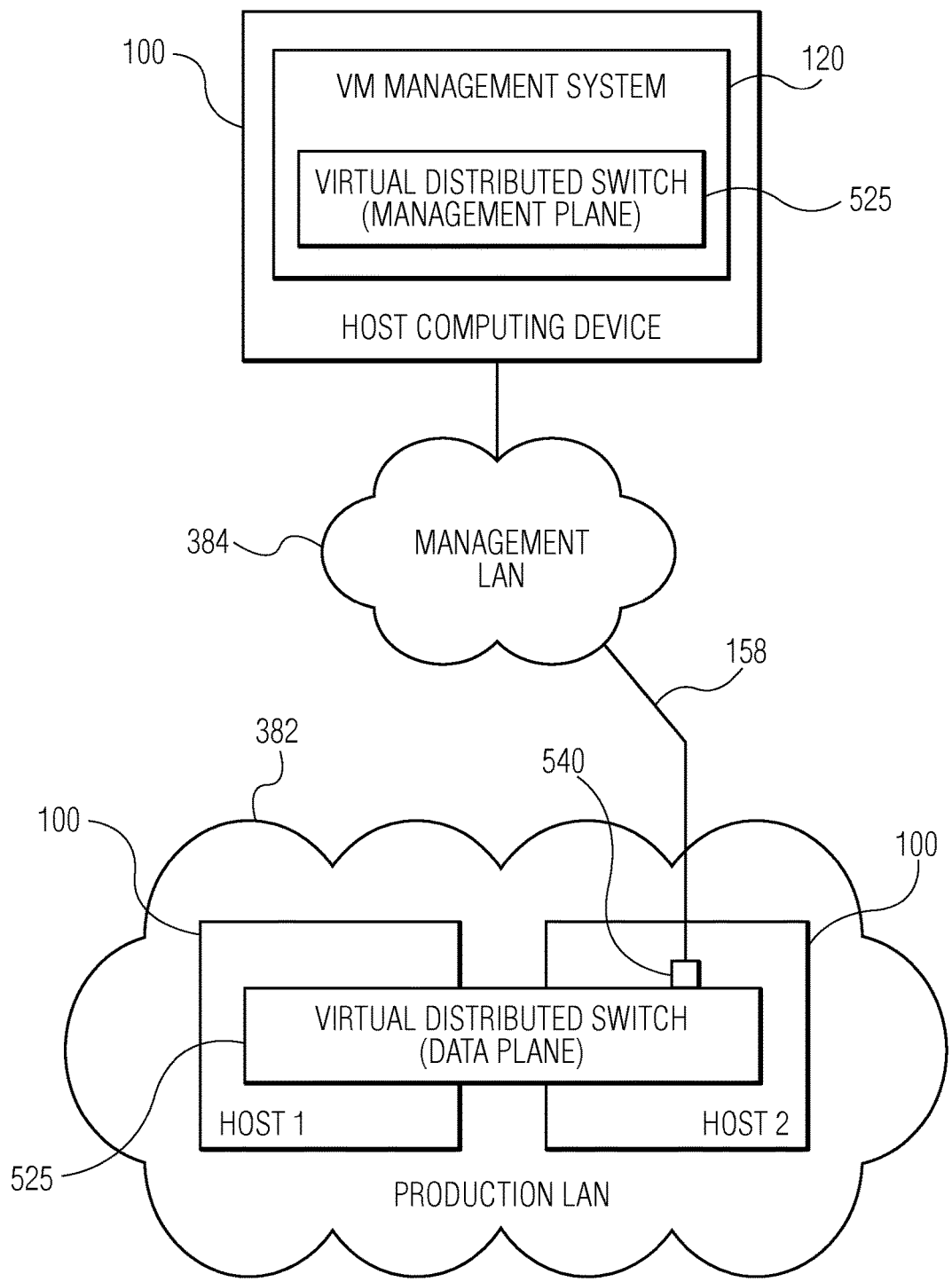
FIGS. 6A, 6B, 6C, and 6D provide a conceptual illustration of recovering communication between a virtual machine management system and a VDS.

FIG. 6A depicts a host computing device 100 that supports a virtual machine management system 120 and multiple host computing devices 100 that support a VDS 525. As shown in FIG. 6A and described above with reference to FIG. 5, a management plane portion of the VDS is instantiated on the same host computing device as the virtual machine management system and a data plane portion of the VDS is instantiated on the host computing devices that are part of the production LAN 382. A management LAN 384 connects the host computing device that supports the virtual machine management system and the management plane portion of the VDS to the production host computing devices that support the data plane portion of the VDS. As illustrated in FIG. 6A, a working communication channel 158 exists between the virtual machine management system and the VDS via a virtual port 540, which is instantiated on "Host 2." If virtual port 540 somehow gets misconfigured, the ability to communicate with the virtual machine management system may be lost.

Figure 6B:
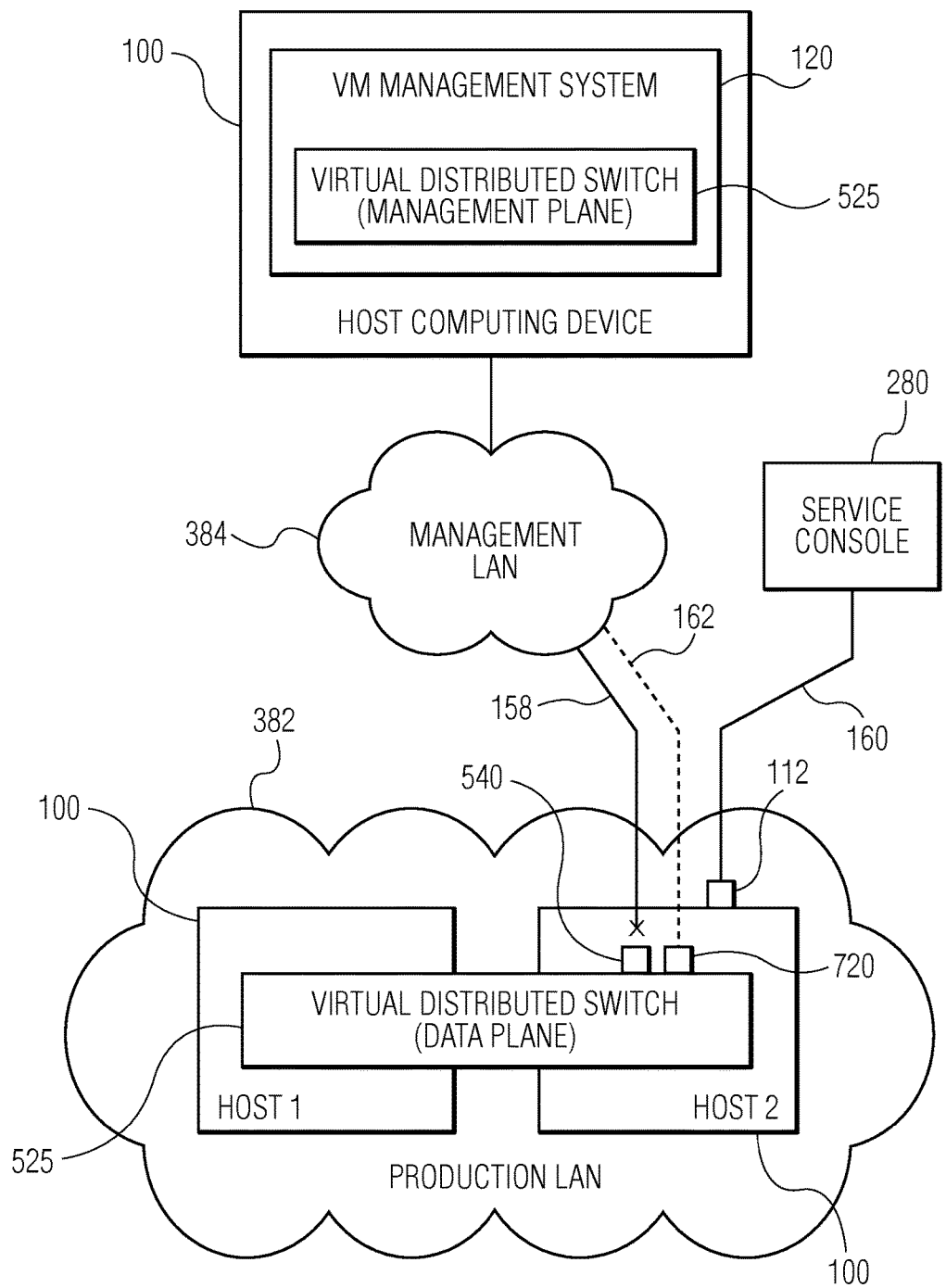

FIG. 6B illustrates a first portion of a process to restore communication between the virtual machine management system 120 and the VDS 525 when the ability to communicate is lost due to a misconfigured virtual port. As shown in FIG. 6B, a service console 280 is directly connected to the host computing device 100, "Host 2," via a physical connection 160 that includes a network communication interface 112 (e.g., an actual physical Ethernet adapter on the host computing device.) The physical connection to the host computing device provides a communications channel to access the host computing device and the VDS. In an embodiment, if it is determined that communication between the virtual machine management system and the VDS has been lost (e.g., due to a misconfigured virtual port 540), a direct connection is established to the underlying host computing device, "Host 2," of the VDS, "Host 2," via the physical connection using the service console. Once the direct connection is established, a clone 720 of the virtual port 540 is created at the host computing device. For example, the cloned virtual port is created by reading the VDS data stored at the host computing device, "Host 2," and copying configuration data related to the virtual port to make a second identically configured port. In an embodiment, the cloned virtual port has an initial configuration that is the same as the last configuration of the virtual port. Because the virtual port is not able to communicate with the virtual machine management system, it is most likely that the cloned virtual port, as initially created, cannot communicate with the virtual machine management system. Therefore, at least one configuration parameter of the cloned virtual port must be modified so that communication between the VDS and the virtual machine management system is again possible. In the embodiment of FIG. 6B, the configuration of the cloned virtual port is modified by manual interaction of a network administrator via the service console 280 and the corresponding physical connection to establish communication between the virtual machine management system and the VDS via the cloned virtual port. Once established, the connection between the virtual machine management system and the VDS via the cloned virtual port can serve as an alternative communication channel 162 between the virtual management system and the VDS to reconfigure and effectively "fix" the misconfigured virtual port.

Figure 6C:
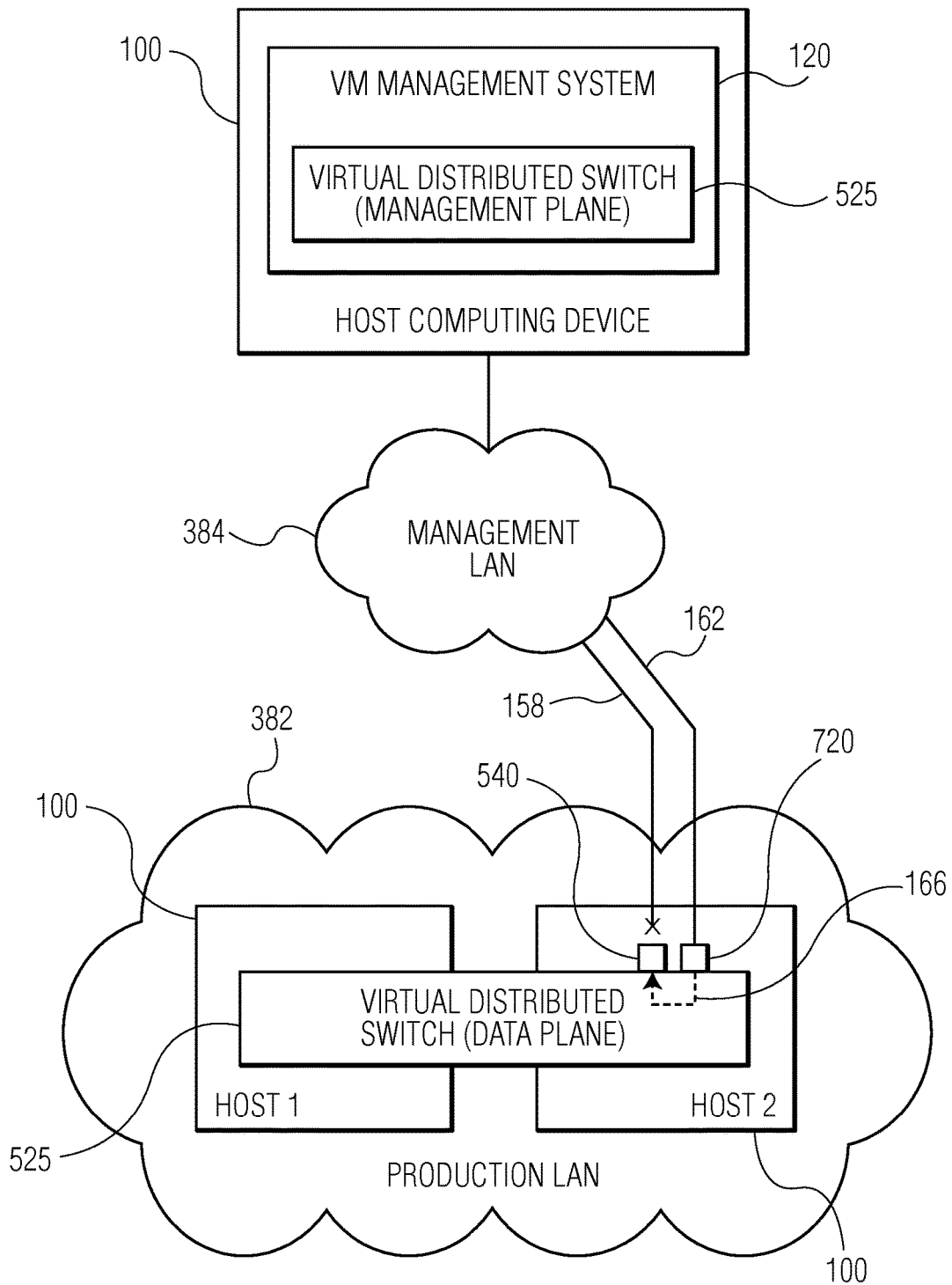

FIG. 6C illustrates the cloned virtual port 720 and the alternative communication channel 162 being utilized to reconfigure the virtual port 540 and restore the original communication channel between the virtual machine management system 120 and the virtual port. Once the alternative communication channel is established between the virtual machine management system and the virtual port, the virtual machine management system can direct traffic to the VDS 525 via the cloned virtual port and the connection between the VDS and the service console can be terminated. The virtual machine management system, as the source of truth for a proper configuration of the VDS, can then provide configuration information to the VDS by way of the alternative communication channel (as indicated by dashed line 166), to reconfigure the virtual port. In particular, the virtual port is reconfigured so as to restore the ability to communicate between the virtual machine management system and the VDS.

Figure 6D:
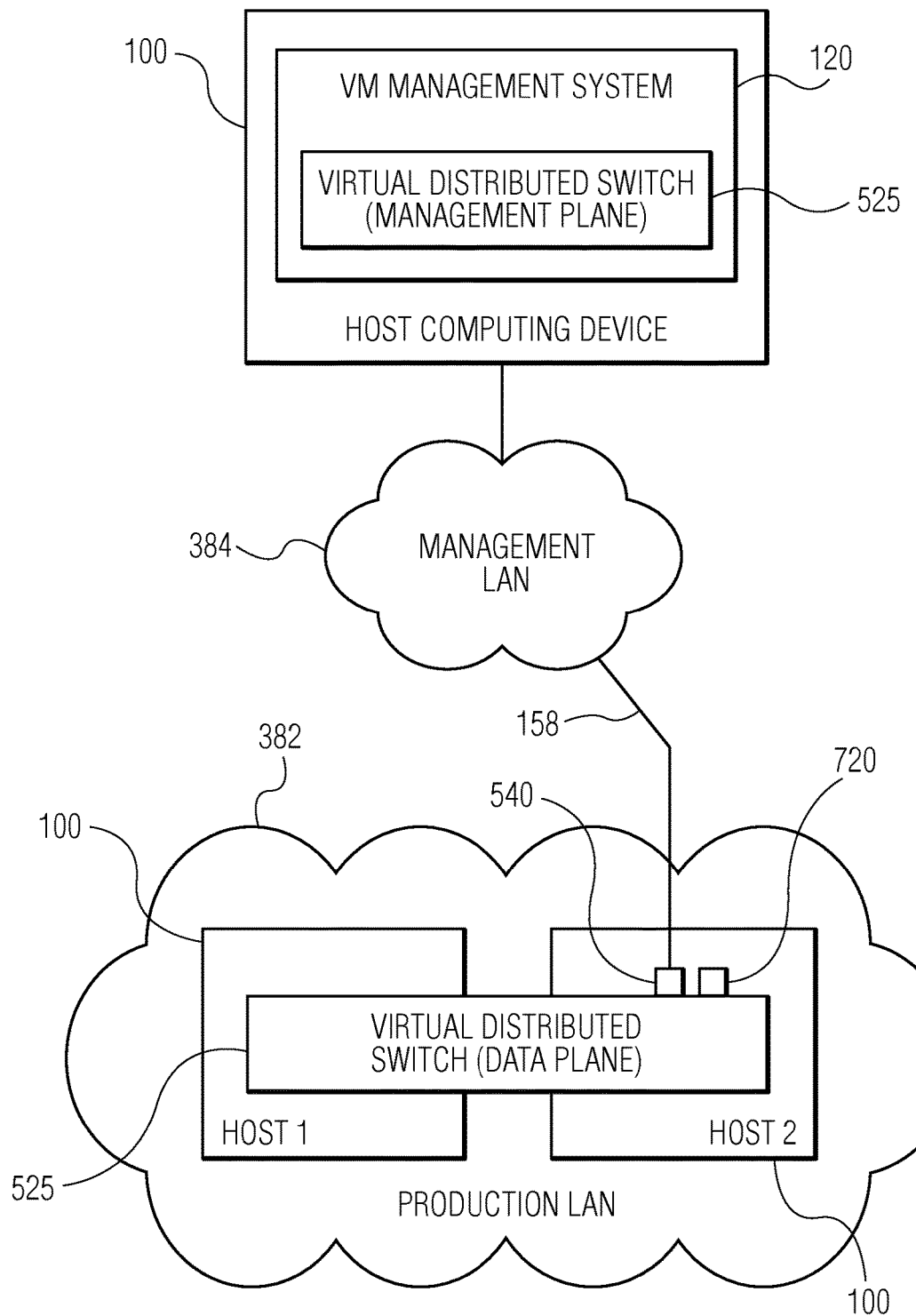

Once the virtual port 540 is properly reconfigured and the ability to communicate between the virtual machine management system 120 and the VDS 525 is restored, traffic can be directed to the VDS via the virtual port instead of the cloned virtual port 720. FIG. 6D depicts the original communication channel 158 after it has been restored via the cloned virtual port. If the cloned virtual port is no longer needed, the cloned virtual port can be removed from the host computing device, e.g., deleted from memory.

Various techniques can be used to determine if a virtual port on a managed node has become misconfigured such that the virtual machine management system is unable to communicate with a managed node. In an embodiment where the managed node is a VDS, a known configuration message protocol between the virtual machine management system and the VDS is monitored to determine if communications to the VDS are being received. For example, after making a first configuration call to the VDS, the virtual machine management system will make a subsequent configuration call to the VDS. If the message protocol reports that the configuration call was not received by the VDS, the virtual machine management system can determine that subsequent communications with the VDS are unsuccessful and report to the virtual machine management system user interface that the virtual port is misconfigured.

Figure 7:
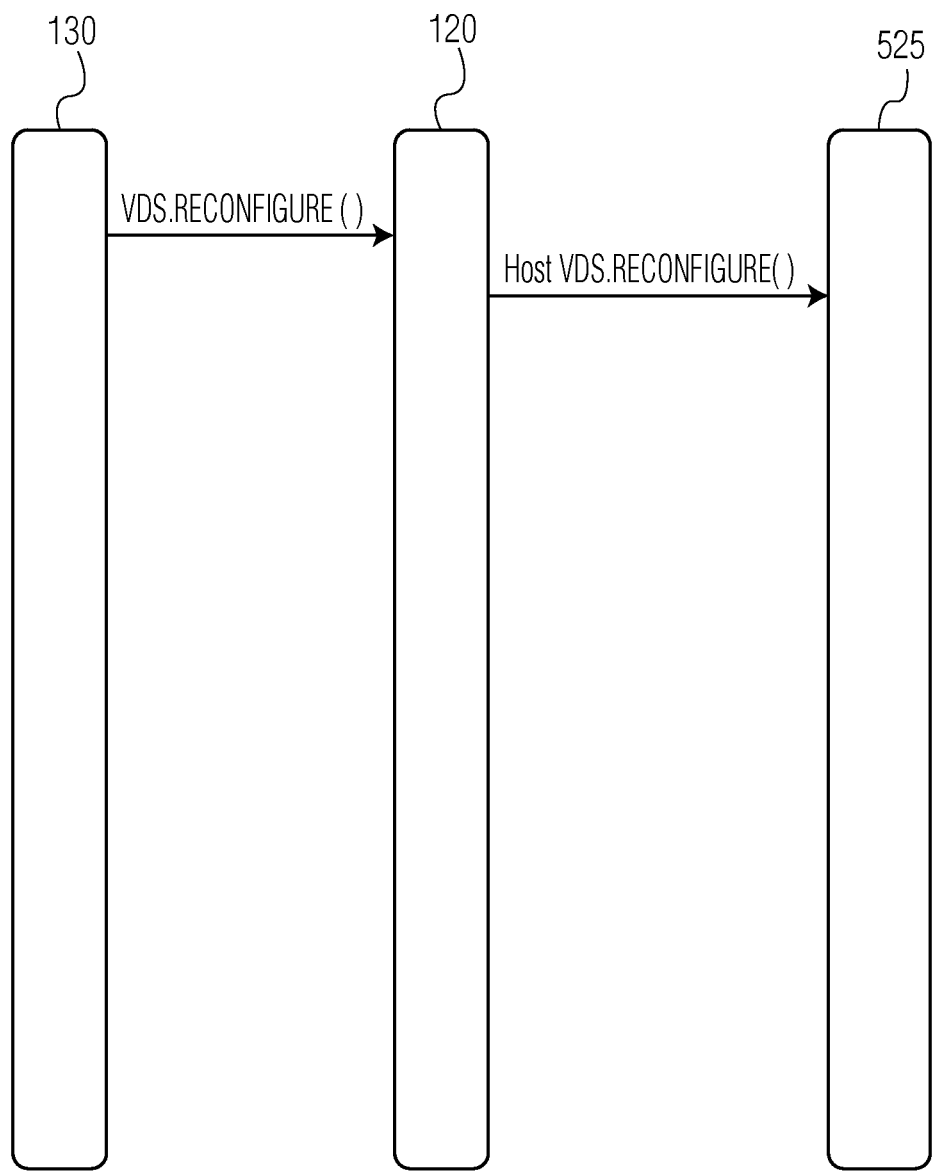
FIG. 7 depicts a transaction workflow in which a configuration change leaves a working connection between a virtual machine management system and a managed node.
Figure 8:
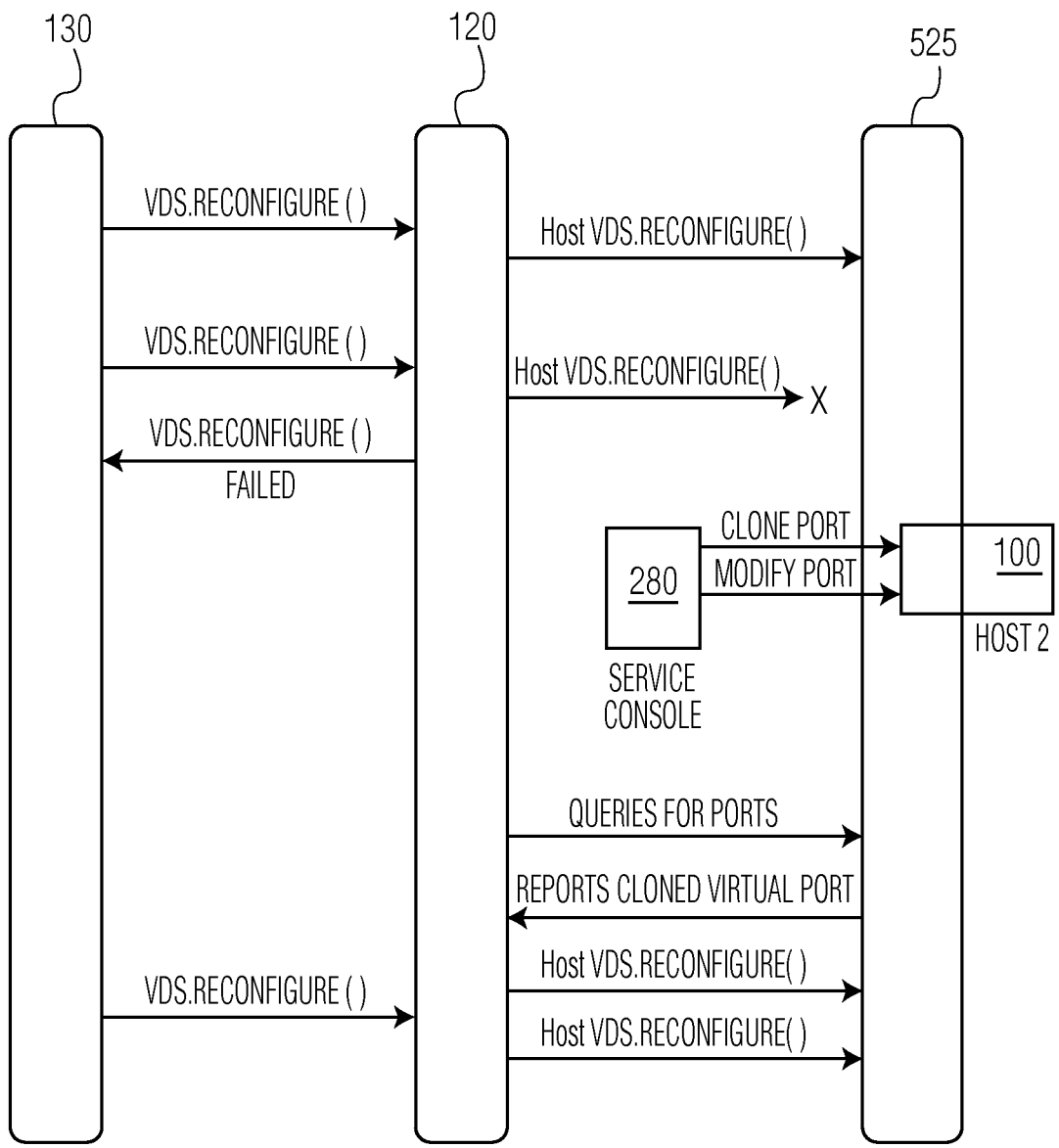
FIG. 8 depicts a transaction workflow in which a cloned virtual port is created because the virtual machine management system is unable to communicate with the managed node after a configuration change.

FIGS. 7 and 8 illustrate transaction workflows between a virtual machine management system and a managed node (e.g., the virtual machine management system 120 as described with reference to FIGS. 2 and 3 and the virtual switches 225 as described with reference to FIG. 1). FIG. 7 illustrates a case in which a configuration change leaves a working connection between the virtual machine management system and the managed node and FIG. 8 depicts a case in which a cloned virtual port is created because the virtual machine management system is unable to communicate with the managed node after a configuration change.

Referring to FIG. 7, a message flow is depicted between a virtual machine management system client 130, a virtual machine management system 120, and a VDS 525. In an embodiment, the message flow of FIG. 7 is applicable to configuration changes made to a VDS, a port group, or to some other managed node through the virtual machine management system. In a first operation, a configuration command (VDS.Reconfigure( )) is sent from the virtual machine management system client 130 to the virtual machine management system 120. In a next operation, the virtual machine management system 120 sends an "Invoke Transaction" call (HostVDS.Reconfigure( )) to the VDS and the VDS adopts the configuration. After the adoption of the configuration, communication with the VDS is still possible.

In some cases, for reasons as explained above, an adopted configuration change may cause communications between a virtual machine management system and a VDS to be lost. FIG. 8 illustrates a method for managing the configuration of managed nodes when a configuration change results in the loss of the ability to communicate between the virtual machine management system and a managed node via a virtual port on the managed node. In an embodiment, the message flow of FIG. 8 is applicable to configuration changes made to a VDS, a port group, or some other managed node through the virtual machine management system. In a first operation, a configuration command (VDS.Reconfigure( )) is sent from the virtual machine management system client 130 to the virtual machine management system 120. The virtual machine management system then sends an "Invoke Transaction" call (HostVDS.Reconfigure( )) to the VDS 525 and the VDS adopts the configuration. A next configuration command (VDS.Reconfigure( )) is sent from the virtual machine management system client to the virtual machine management system in a next operation and the virtual machine management system then sends an "Invoke Transaction" call (HostVDS.Reconfigure( )) to the VDS, but the message does not make it to the VDS and the message protocol reports that the message was not delivered. In an embodiment, the report is returned to the virtual machine management system client and read by a network administrator. In response to the report, the network administrator uses the service console 280 to access a host computing device 100 (e.g., "Host 2") within which the VDS is instantiated and creates a cloned virtual port 720 from configuration data of the virtual node that was used for previous communications. The virtual machine management system then sends configuration calls via the cloned virtual port to reconfigure the virtual port so that communication between the virtual machine management system and the VDS via the virtual port is restored. Once communication between the virtual machine management system and the VDS is restored via the virtual port, the cloned virtual port may be maintained or removed as needed.

Figure 9:
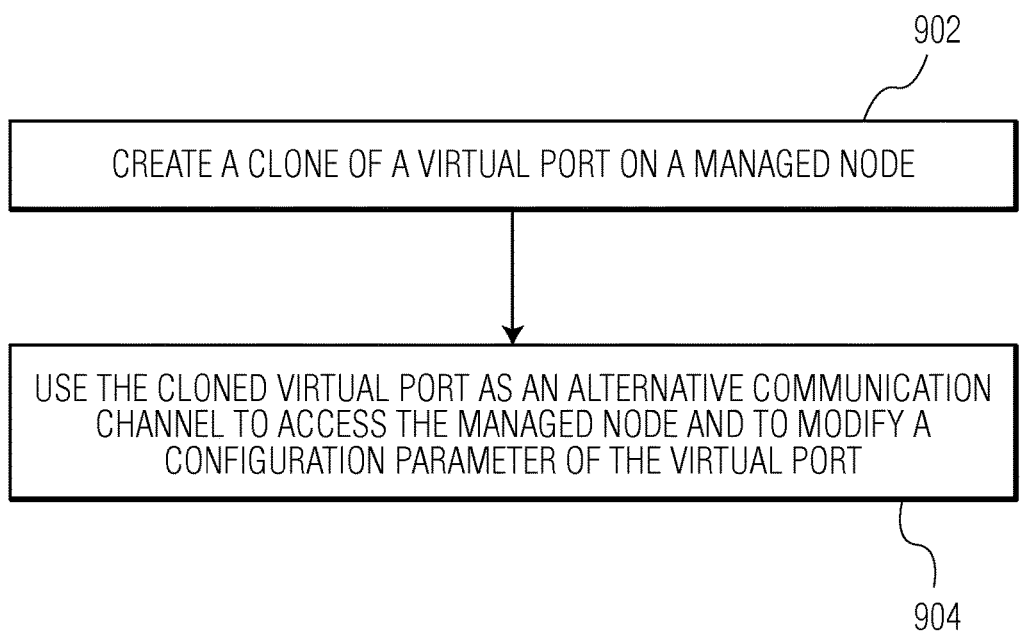
FIG. 9 is a process flow diagram of a technique for restoring communication between a virtual machine management system and a managed node by creating a cloned virtual port of a virtual port on the managed node in accordance with an embodiment of the invention.

FIG. 9 is a process flow diagram of a method for managing the configuration of managed nodes in a virtual machine network. At block 902, a clone of a virtual port on a managed node is created. At block 904, the cloned virtual port is used as an alternative communication channel to access the managed node and to modify a configuration parameter of the virtual port.

In an alternative embodiment, the systems and methods described herein are applicable to other managed nodes. For example, the systems and methods described herein are applicable when the managed node is a virtual standard switch (VSS).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer readable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing the configuration of managed nodes in a virtual machine network, the method comprising:
creating a clone of a virtual port on a managed node, wherein creating the cloned virtual port comprises saving a copy of a last configuration of the virtual port at a host computing device that hosts the managed node;
configuring the cloned virtual port so that a virtual machine management system and the managed node can communicate via the cloned virtual port;
directing traffic between the virtual machine management system and the managed node via the cloned virtual port;
reconfiguring the virtual port to restore communication between the virtual machine management system and the managed node via the virtual port; and
directing subsequent traffic between the virtual machine management system and the managed node via the virtual port once communication via the virtual port has been restored.

2. The method of claim 1 further comprising:
accessing the managed node via a physical connection to a host computing device that hosts the managed node;
wherein the cloned virtual port has an initial configuration identical to a last configuration of the virtual port on the managed node; and
wherein the configuration parameter of the cloned virtual port is modified to enable communication between a virtual machine management system and the managed node via the cloned virtual port.

3. The method of claim 2 wherein accessing the managed node further comprises utilizing a service console that is separate from the virtual machine management system.

4. The method of claim 1, wherein the cloned virtual port is removed from the managed node after modification of the virtual port is complete and subsequent traffic is directed via the virtual port.

5. The method of claim 1 wherein the managed node is a virtual switch.

6. A non-transitory computer-readable storage medium containing program instructions for managing the configuration of managed nodes in a virtual machine network, wherein execution of the program instructions by one or more processors causes the one or more processors to perform steps comprising:
creating a clone of a virtual port on a managed node, wherein creating the cloned virtual port comprises saving a copy of a last configuration of the virtual port at a host computing device that hosts the managed node;
configuring the cloned virtual port so that a virtual machine management system and the managed node can communicate via the cloned virtual port;
directing traffic between the virtual machine management system and the managed node via the cloned virtual port;
reconfiguring the virtual port to restore communication between the virtual machine management system and the managed node via the virtual port; and
directing subsequent traffic between the virtual machine management system and the managed node via the virtual port once communication via the virtual port has been restored.

7. The non-transitory computer-readable storage medium of claim 6, wherein creating a cloned virtual port of a virtual port on a managed node involves accessing a managed node via a physical connection to a host computing device that hosts the managed node;
wherein the cloned virtual port has an initial configuration identical to a last configuration of the virtual port on the managed node; and
wherein the configuration parameter of the cloned virtual port is modified to enable communication between a virtual machine management system and the managed node.

8. The non-transitory computer-readable storage medium of claim 7, wherein accessing the managed node further comprises utilizing a service console that is separate from the virtual machine management system.

9. The non-transitory computer-readable storage medium of claim 6, wherein the cloned virtual port is removed from the managed node after modification of the virtual port is complete and subsequent traffic is directed via the virtual port.

10. The non-transitory computer-readable storage medium of claim 7 wherein the managed node is a virtual switch.

11. A computer system comprising:
at least one host computing device, the host computing device including a processor and memory for instantiating managed nodes thereon; and
the at least one host computing device being configured to:
create a clone of a virtual port on at least one of the managed nodes, wherein the creating of the clone of the virtual port comprises saving a copy of a last configuration of the virtual port at the at least one host computing device that hosts the managed node;
configure the cloned virtual port so that a virtual machine management system and the managed node can communicate via the cloned virtual port;
direct traffic between the virtual machine management system and the managed node via the cloned virtual port;
reconfigure the virtual port to restore communication between the virtual machine management system and the managed node via the virtual port; and
direct subsequent traffic between the virtual machine management system and the managed node via the virtual port once communication via the virtual port has been restored.

12. The computer system of claim 11 further comprising:
accessing the managed node via a physical connection to a host computing device that hosts the managed node;
wherein the cloned virtual port has an initial configuration identical to a last configuration of the virtual port on the managed node; and
wherein the configuration parameter of the cloned virtual port is modified to enable communication between a virtual machine management system and the managed node via the cloned virtual port.

13. The computer system of claim 12 wherein accessing the managed node further comprises utilizing a service console that is separate from the virtual machine management system.

* * * * *